Patented Aug. 25, 1953

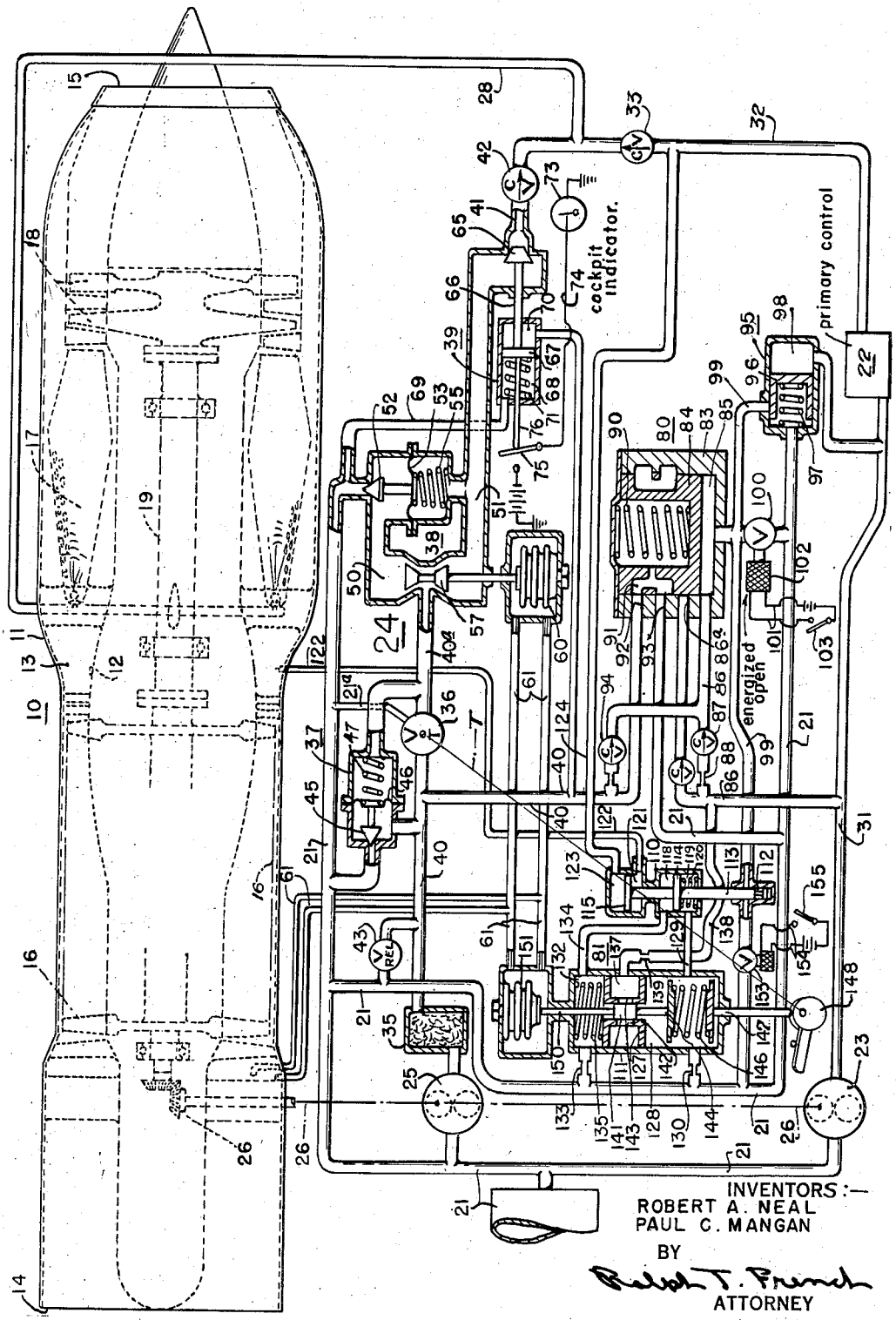

2,649,906

UNITED STATES PATENT OFFICE 2,649,906

SELECTIVE FUEL CONTROL APPARATUS FOR TURBOJET ENGINES

Robert A. Neal, Media, and Paul C. Mangan, Ridley Park, Pa., assignors to Westinghouse Electric Corporation, East Pittsburgh, Pa., a corporation of Pennsylvania Application March 17, 1950, Serial No. 150,199

3 Claims. (Cl. 158—36.4)

This invention relates to fluid fuel control apparatus, and more particularly to an aviation fuel system having selective primary and emergency control.

It has been proposed to equip a high-speed aircraft power plant, such as a gas turbine engine having critical fuel requirements, with alternatively operative primary and stand-by or emergency fuel control means, for minimizing the dangerous consequences of sudden failure of the fuel supply during flight operation. Preferably, such a dual fuel control includes primary and emergency pumps and is provided with means automatically operative to effect quick change-over from primary fuel control to emergency fuel control in the event of failure of the primary pump or other elements associated therewith. It is an object of the present invention to provide improved fuel control apparatus of this type, which is selectively operative to render the emergency fuel control quickly available under various flight operational conditions.

Another object of the invention is the provision of improved change-over or selector means for the dual fuel system of an aircraft power plant, wherein a selected operative pressure incident to normal operation of the primary fuel control portion, during a take-off operation for example, is rendered the determinative or measure of subsequent performance thereof, so that a sudden reduction in efficiency of the primary system will be immediately detected to facilitate automatic change-over to the emergency fuel control.

A further object of the invention is to provide improved aircraft fuel control selector means for effecting change-over from primary fuel control to emergency fuel control, which can be rendered quickly operative either automatically, as in response to failure of the primary control to maintain a predetermined performance level, or manually at the will of the pilot.

It is particularly an object of the present invention to provide improved fuel control apparatus of the aforesaid type, in which the pilot's throttle setting and the density of air supplied to the engine will determine the critical performance level or standard of operation to be maintained by the primary fuel control means, failure to attain such performance level being followed by automatic change-over to emergency fuel control.

These and other objects are effected by the invention as will be apparent from the following description and claims taken in connection with the accompanying drawings, forming a part of this application, in which the single figure is a diagrammatic view of a dual fuel supply system for a power plant of the gas turbine type, including emergency control and selector means therefor constructed in accordance with the invention.

In the drawing, a gas turbine engine 10 is provided, comprising a generally cylindrical casing 11 having axially mounted therein a sectional core structure 12 forming an annular fluid flow passageway 13, which extends longitudinally through the engine from a forwardly directed air intake opening 14 to a rearwardly disposed jet discharge nozzle 15. The operating components of the engine are arranged along the axis thereof and include an axial flow compressor 16, annular combustion apparatus 17 and a turbine 18, the rotor of which is operatively connected to the rotor of the compressor by a shaft 19. In operation, with the engine disposed in an aircraft so that the air intake 14 is pointed in the line of flight, air entering the intake opening is compressed by the compressor 16 and passes through the passage 13 to the combustion apparatus 17 for supporting combustion of liquid fuel, which is supplied thereto in a manner hereinafter explained. The resultant hot motive fluid is then expanded through the turbine 18 and discharged to atmosphere through the nozzle 15 in the form of a jet establishing a propulsive thrust.

For supplying fuel under suitable pressure to the combustion apparatus of the engine 10 there is provided a dual fuel control system, comprising a low pressure source of liquid fuel such as a tank and pipe system generally indicated at 21, primary fuel control apparatus 22 having a primary pump 23, and standby or emergency fuel control apparatus generally indicated at 24 and having an emergency pump 25. Both pumps 23 and 25 are operatively connected through the medium of suitable shaft and gear mechanism 26 to the rotor of the engine compressor 16, and are thus adapted to be driven simultaneously by the engine. Either the primary fuel control apparatus 22 or the emergency fuel control apparatus 24 may be conditioned to control the metering of fuel to the engine combustion apparatus 17 through a manifold pipe 28, the emergency control apparatus 24 being normally rendered inoperative, however, until failure or loss of efficiency of the primary control apparatus 22 renders necessary a change-over to fuel metering by the emergency control apparatus, as hereinafter more fully explained.

To simplify the present disclosure of the invention, the primary fuel control apparatus 22 is illustrated only in diagrammatic form without details other than the primary pump 23. It will be understood that suitable features of construction and operation may be embodied in the primary fuel control, such as means responsive to throttle position and engine speed and temperature for governing the flow of fuel to the combusion apparatus in accordance with operating conditions. It will here suffice to point out that the primary pump 23 has an inlet connected to the tank or low pressure fuel source 21 and a discharge outlet communication 31 leading to the primary fuel control apparatus 22, the fuel discharge or metering communication 32 of which is connected to the manifold pipe 28 leading to the combustion apparatus 17. A check valve 33 is preferably interposed in the metering communication 32 for preventing back flow from the manifold pipe 28.

The emergency fuel control apparatus 24 may be of any suitable construction operable to effect metering of fuel to the engine under sufficient control to enable uninterrupted operation thereof when the primary fuel control fails or is cut out of operation. In association with the emergency pump 25, the emergency control apparatus 24, as illustrated in the drawing, may comprise a filter 35, a manual throttle valve device 36, which may be mechanically interlocked with a similar throttle (not shown) of the primary control 22, a differential relief valve 37, a barometric relief valve device 38 and a shut-down valve device 39, which are interposed in series relation in a pump discharge communication generally indicated at 40 and 40a, through which fuel discharged from the emergency pump 25 flows to the pipe 28 by way of a discharge communication 41 containing a check valve 42. An excess-pressure responsive relief valve device 43 of conventional design may be provided for by-passing fuel from the pump discharge communication 40 to the low pressure source or pipe 21 in the possible event of building up of a fuel pressure high enough to jeopardize the operating elements of the fuel system.

The differential relief valve device 37 comprises casing structure containing a valve element 45 controlling another by-pass communication from the pump discharge communication 40 to the low pressure pipe 21. The valve element 45 is actuated by a diaphragm 46 subject to opposing pressures of fuel at the inlet and discharge sides of the throttle valve device 36. A spring 47 is provided for biasing the valve element 45 toward closed position, in opposition to pressure of fuel in communication 40 on the upstream side of the throttle valve device 36. In operation, the differential relief valve device 37 is adapted to by-pass fuel under pressure from the pump discharge pipe 40 to the low pressure pipe 21 in sufficient quantity to maintain a constant pressure drop across the throttle valve device 36, regardless of variations in fuel flow under different operating conditions. The throttle valve device 36 may be adapted to control communication from the pump discharge passage 40 to either the communication 40a, or through a branch 21a to the low pressure or pump inlet system 21, when in shut-off position.

The barometric relief valve device 38 is arranged to control the flow of fuel conducted through the communication 40a from the manual throttle valve device 36 in such a manner as to maintain a fixed pressure relationship under varying conditions of altitude, flight speed and ambient temperature. The device 38 comprises casing structure having a valve chamber 50 adapted to communicate with the pump discharge communication 40a, and an outlet chamber 51 which is interposed between the pump discharge communication 40 and communication 41. A relief valve element 52 is mounted in one end of the valve chamber 50 for controlling communication therefrom to the low pressure pipe 21, subject to operation of a diaphragm 53 that is connected thereto and interposed between chambers 50 and 51. A spring 55 is associated with the diaphragm 53 for urging the valve element 52 toward its seat in opposition to fuel pressure in the valve chamber 50. The valve element 52 is operative to maintain a fixed pressure relationship in cooperation with a flow divider valve element 57 having opposed seating portions, which is interposed between the connected portions of chambers 50 and 51 and actuated by a bellows diaphragm 60, subject to compressor inlet total and static air pressure admitted through a pair of conduits 61, for dividing the flow of fuel under pressure from the manual throttle valve device 36 to the respective chambers 50 and 51 in accordance with changes in ambient pressure to maintain the engine rotational speed constant relative to throttle setting.

The shut-down valve device 39 serves to cut off all flow of fuel from the emergency control apparatus to the engine when the throttle is set in the shut-down position, or when the emergency control apparatus is inoperative, and comprises a valve element 65 having a stem 66 connected to a piston 67, which is mounted in casing structure between a chamber 68 communicating through a passage 69 with the low pressure pipe 21, and a chamber 70 communicating with the emergency pump discharge communication 40. A spring 71 disposed in the chamber 70 acts on the piston 67 to urge the valve element 65 toward its seated position. The spring is thus operative to close the shut-down valve device 39 so long as the pressure of fuel in the pump discharge communication 40 is below a predetermined operational value. For indicating to the pilot that the engine is operating on the emergency system when such is the case, an electro-responsive cockpit indicator 73 may be provided, to be energized through a suitable circuit 74 upon operation of a switch 75 by a stem 76 of the piston 67 when the latter is moved by emergency fuel pressure against the force of the spring 71.

It will be understood that the elements of the emergency fuel control apparatus 24, just described, may in practice be constructed and arranged in a unitary casing structure having suitable passages for affording the desired communications.

According to the invention, for selecting operation of either the primary fuel control apparatus 22 or the emergency fuel control apparatus 24, while rendering inoperative whichever apparatus is not to function, there are provided a change-over or selector valve device 80, and a pilot valve device 81 for effecting quick operation thereof in the event of failure of the primary control during a take-off operation of the aircraft.

The selector valve device 80 comprises a casing 83 having a bore in which a piston valve element 84 is slidably mounted, forming on one side a control chamber 85 which communicates with the primary pump discharge communication 31 by way of one branch of a communication 86 including a check valve 87 for preventing backflow to the communication 31. A restricted passage 88 may be provided upstream of the check valve 87 for minimizing surging of pressure in the control chamber 85. Disposed on the opposite side of the piston valve element 84 is a biasing spring 90, which is adapted to urge the valve element toward its emergency position upon predetermined reduction in fuel pressure in the chamber 85, as hereinafter explained. With the piston valve element 84 maintained in its normal position, as shown in the drawing, a cavity 91 therein registers with a port 92 connected to the emergency pump discharge communication 40, and with a port 93 which is connected to the low pressure pipe system 21. For ensuring initial movement of the piston valve element 84 to normal position in opposition to the force of spring 90, when the fuel supply apparatus is started, a branch communication and check valve 94 are provided to conduct fuel from the emergency pump discharge communication 40 through the communication 86 to the control chamber 85, augmenting the output of primary pump 23.

Associated with the selector valve device 80 is a fuel pressure responsive pilot or release valve device 95, comprising a casing having a bore in which a piston valve element 96 is subjected to the force of a spring 97 and adapted for movement thereby for establishing communication from the control chamber 85 to the low pressure pipe 21 by way of a communication 99. The valve element 96 is normally maintained in a closed position, as shown, by the pressure of fuel in a chamber 98 communicating with the primary pump discharge communication 31.

A normally closed electro-responsive release valve device 100 is also interposed between the communications 99 and 21, and is adapted to be actuated to establish communication therebetween upon energization of a circuit 101 including an operating magnet 102, which circuit is preferably controlled manually through the medium of a suitable switch 103.

The pilot may at any time render the emergency fuel control apparatus 24 operative, to permit checking thereof, by closing switch 103 to effect opening of the release valve device 100. In case of an electrical power failure, the fluid pressure responsive release valve device 95 will ultimately operate in response to predetermined reduction in pressure of fuel from the primary control apparatus 31, incident to failure thereof, to cut the emergency control apparatus 24 into effective operation.

In order to render the emergency fuel control automatically available with minimum lapse of time, as in case of sudden failure of the primary fuel control apparatus 22 during a take-off maneuver of the aircraft equipped with the engine 10, the pilot valve device 81 is constructed and arranged to control the selector valve device 80 in accordance with variations in a relationship between actual flow of fuel to the engine and a computed or reference flow of fuel as determined by fluid pressure means sensitive to the throttle setting and to the condition of air admitted to the engine.

The pilot valve device 81 comprises an operating portion 110 and a control portion 111. Operatively mounted in the operating portion 110 is a shuttle valve element 112, which is operative to control discharge flow of fuel from the communication 99 to the low pressure pipe system 21. A stem 113 connects the shuttle valve 112 to a pair of movable abutments such as pistons 114 and 115, disposed in separate bores formed in the casing structure of the operating portion 110. The piston 114 is interposed between a chamber 118 and a spring chamber 119 containing a coil spring 120 for biasing the shuttle valve 112 toward its open position. The other piston 115 is interposed between a chamber 121 communicating through a pipe 122 with the passage 13 at the discharge side of the engine compressor 16, and a chamber 123 communicating by way of a pipe or passage 124 with the fuel metering communication 32 of the primary control apparatus 22. The arrangement of these elements is such that pressure of fuel in the chamber 123 tends to close valve 112 by acting on piston 115 in opposition to the pressure on piston 114 of spring 120 and of fuel admitted to chamber 119, as hereinafter explained.

The control portion 111 of pilot valve device 81 comprises a cylinder in which is slidably mounted a movable abutment or valve piston 127 on one side of which is formed a reference pressure chamber 128, which communicates through a passage 129 with the spring chamber 119, and through a restricted passage 130 with the low pressure pipe system 21. On the opposite side of the valve piston 127 is formed a chamber 132 that is connected with the low pressure pipe system 21 by way of a restricted passage 133 and with the chamber 118 by way of a communication 134. A coil spring 135 is interposed between the valve piston 127 and a wall of chamber 132. The valve piston 127 has end walls or flanges which form an annular central channel 137 that communicates with the primary pump discharge outlet 31 through a passage 138 having a restricted portion 139, and the communication 86.

Communication between the channel 137 and reference pressure chamber 128 is controlled by a servo-valve element 141, which is slidably disposed in a central bore 142 of the valve piston 127 for cooperation with one or more ports 143 formed therein. A lower stem and follower element 144 of the servo-valve element 141 engages a coil spring 146 carried by a plunger 147, the lower end of which operatively engages a rotary cam element 148. The latter is adapted for cooperative connection with the usual movable element of the throttle valve device 36, so as to be positioned accordingly, as indicated by the broken line T. Movement of the throttle toward its wide open position will effect operation of the cam element 148 to shift the plunger 147 upwardly, and vice versa, as viewed in the drawing. The servo-valve element 141 also has an upper stem 150 which extends into operative engagement with a partially evacuated bellows diaphragm 151, which is contained in an envelope to which the conduits 61 are adapted to communicate variations in total and static inlet pressure of air entering the engine compressor 16. The bellows diaphragm 151 is adapted to collapse upon increase in total pressure, and will expand somewhat on increase in ambient temperature. It will thus be seen that the servo-valve element 141 is adapted to be held in position by opposing pressures exerted by the bellows diaphragm 151 responsive to air density and by the throttle operated cam 148 acting through the spring 146, while the movable abutment or valve piston 127 is independently movable relative to the valve element 141 in accordance with pressure applied on the opposite sides thereof facing the respective chambers 128 and 132.

In operation, assuming that the primary fuel control apparatus 22 is initially functioning in the desired manner to schedule flow of fuel under pressure to the metering communication 32 and thence through manifold 28 to the engine, fuel at the same pressure is consequently maintained in the chamber 123 above piston 115, for holding the shuttle valve 112 in closed position, as shown, against the opposing compressor discharge pressure in chamber 121, and of spring 120 plus the reference pressure of fuel maintained in chamber 119. This reference pressure is in effect a function of the condition of air entering the compressor inlet 14 and of the engine speed as indicated by the position of the engine throttle apparatus, including the throttle device 36. For example, an increase in pressure of the air entering inlet 14 will effect contraction of the bellows diaphragm 151, tending to lift the servo-valve 141 to supply fuel, under primary pump discharge pressure, from the chamber 137 to the chamber 128, thus increasing the reference pressure acting therein until valve piston 127 is shifted against the force of spring 135 to cut off further flow of fuel past the servo-valve. Similarly, movement of the throttle apparatus, including valve device 36 and the connected cam 148, to effect an increase in the supply of fuel to the engine, will result in upward movement of the plunger 147 and spring 146 tending to raise the follower 144 and servo-valve 141 for effecting further increase in the reference pressure in chamber 128. The construction and proportioning of the cam 148 and of the springs 135 and 146 are preferably chosen to render the servo-valve 141 operative to schedule the reference pressure in chamber 128, and consequently in chamber 119, to follow closely the output pressure of fuel delivered from the primary fuel control apparatus 22 to the engine by way of the metering communication 32. The latter pressure is impressed downwardly on the piston 115 to oppose the reference pressure acting upwardly on piston 114, modified by compressor discharge pressure in chamber 121, as already explained.

It will be understood that, with pistons 115 and 114 thus constructed and arranged to detect significant variations in the actual pressure of fuel supplied to the engine relative to the reference pressure in chamber 128, a fall in the output of the primary control apparatus 22, incident to failure thereof, will cause quick operation of the shuttle valve 112 to discharge fuel under pressure from the control chamber 85 of the selector valve device 80, effecting movement of the piston valve element 84 to emergency position. In this position of the piston valve element 84, the cavity 91 connects the port 93 to a port 86a, whereupon fuel is by-passed from the primary pump 23 to the low pressure inlet pipe system 21. At the same time, further by-passing of fuel from the emergency pump 25 by way of the selector valve device 80 is cut off. The emergency fuel control apparatus 24 is thereby rendered operative to assume the burden of metering fuel to the engine 10 in the manner already explained.

Interposed in the communication 99 between the shuttle valve 112 and the low pressure pipe system 21 is a normally open solenoid valve 153, which is adapted to be energized through the medium of a circuit 154 and manual switch 155 for closing that communication. The solenoid valve 153 is adapted to be closed to restore control of the fuel supply to the primary control apparatus, following correction of a fault contributing to a change-over operation.

From the foregoing, it will be seen that the emergency fuel control equipment constructed in accordance with the invention will be completely automatic under aircraft take-off conditions, as well as for flight conditions, and will be operative to detect incipient failure of the primary fuel control in time to effect a change-over in control to the emergency fuel system without appreciable loss in engine thrust.

While we have shown our invention in but one form, it will be obvious to those skilled in the art that it is not so limited, but is susceptible of various changes and modifications without departing from the spirit thereof.

What we claim is:

1. In a liquid fuel system for a power plant including a low pressure fuel source, primary and emergency pumps adapted to be jointly operated by the power plant and connected to the fuel source, primary control means normally operative to control the supply of fuel under a metered fuel pressure from said primary pump to the power plant and emergency control means operable to control the supply of fuel under pressure from said emergency pump to the power plant when said primary means is rendered inoperative; the combination of a fluid pressure responsive selector valve device, a first by-pass communication between the outlet of said primary pump and said fuel source, a second by-pass communication between the outlet of said emergency pump and said fuel source, said selector valve device being movable to different positions for opening one or the other of said by-pass communications and having a control chamber connected to said outlet of said primary pump for subjecting said selector valve device to primary fuel pressure for normally maintaining said selector valve device in the position in which only said second by-pass communication is open, a normally closed shuttle valve interposed in a discharge communication between said control chamber and said low pressure fuel source, means operative to maintain a variable reference pressure, and fluid pressure means subject to the opposing pressures of fuel delivered by said primary control means and of said variable reference pressure, said fluid pressure means being operative for opening said shuttle valve in response to a predetermined reduction in said metered fuel pressure relative to said reference pressure, whereby said selector valve device is actuated to close the second by-pass communication for rendering said emergency control means effective to initiate the supply of fuel from said emergency pump to said power plant.

2. Fuel control selector apparatus for an aircraft engine, comprising a throttle, a low pressure source of fuel, engine driven primary and emergency fuel pumps, alternatively operative primary and emergency fuel control systems for supplying the engine with fuel from the low pressure source, a control chamber connected to said primary pump, a spring-biased selector valve operative to render either of said control systems operative, said selector valve being subject to pressure of fuel in said control chamber normally charged by said primary pump for normally maintaining said emergency fuel control system inoperative, a normally closed automatic shuttle valve interposed in a communication between said control chamber and said low pressure source, a movable abutment for actuating said shuttle valve according to the opposing pressures of fuel normally delivered by said primary control system and of a reference pressure, means responsive to atmospheric density, means responsive to the setting of the engine throttle, and a servo-valve device jointly controlled by the last-named two means for establishing said reference pressure.

3. Fuel control selector apparatus as set forth in claim 2 having in combination therewith, a normally closed release valve interposed in the communication between the control chamber and the low pressure source in parallel with said automatic shuttle valve, said release valve being manually operable for effecting operation of the selector valve to render the emergency control system operative regardless of the condition of the primary control system.

ROBERT A. NEAL.
PAUL C. MANGAN.

References Cited in the file of this patent

UNITED STATES PATENTS

| Number | Name | Date |
| --- | --- | --- |
| 2,440,371 | Holley | Apr. 27, 1948 |

FOREIGN PATENTS

| Number | Country | Date |
| --- | --- | --- |
| 918,123 | France | Oct. 7, 1946 |